United States Patent
Tepus

(10) Patent No.: US 9,117,018 B2
(45) Date of Patent: Aug. 25, 2015

(54) METHOD OF DEBUGGING SOFTWARE AND CORRESPONDING COMPUTER PROGRAM PRODUCT

(75) Inventor: Cristian Tepus, Bucharest (RO)

(73) Assignee: Freescale Semiconductor, Inc., Austin, TX (US)

(*) Notice: Subject to any disclaimer, the term of this patent is extended or adjusted under 35 U.S.C. 154(b) by 98 days.

(21) Appl. No.: 13/880,221

(22) PCT Filed: Nov. 25, 2010

(86) PCT No.: PCT/IB2010/055418
§ 371 (c)(1),
(2), (4) Date: Apr. 18, 2013

(87) PCT Pub. No.: WO2012/069883
PCT Pub. Date: May 31, 2012

(65) Prior Publication Data
US 2013/0254750 A1 Sep. 26, 2013

(51) Int. Cl.
*G06F 9/44* (2006.01)
*G06F 11/36* (2006.01)

(52) U.S. Cl.
CPC .......... *G06F 11/362* (2013.01); *G06F 11/3648* (2013.01); *G06F 11/3664* (2013.01); *G06F 11/3688* (2013.01)

(58) Field of Classification Search
CPC .................... G06F 11/3664; G06F 11/3648
USPC .................................. 717/131, 134, 135, 124
See application file for complete search history.

(56) References Cited

U.S. PATENT DOCUMENTS

| | | | |
|---|---|---|---|
| 5,475,624 A | 12/1995 | West | |
| 5,678,028 A | 10/1997 | Bershteyn et al. | |
| 6,493,868 B1 * | 12/2002 | DaSilva et al. | 717/105 |
| 6,708,290 B2 * | 3/2004 | Swoboda et al. | 714/30 |
| 8,117,587 B1 * | 2/2012 | Testardi | 717/100 |
| 8,135,572 B2 | 3/2012 | Crawford et al. | |
| 2003/0070117 A1 | 4/2003 | Matsuki et al. | |
| 2005/0268195 A1 * | 12/2005 | Lund et al. | 714/741 |
| 2006/0117224 A1 * | 6/2006 | Wu | 714/38 |
| 2008/0201453 A1 * | 8/2008 | Assenmacher | 709/219 |
| 2008/0229152 A1 * | 9/2008 | Moroda | 714/38 |
| 2008/0243471 A1 | 10/2008 | Nemecek | |
| 2009/0228862 A1 * | 9/2009 | Bertelrud et al. | 717/100 |
| 2009/0228873 A1 * | 9/2009 | Drukman et al. | 717/128 |
| 2010/0146338 A1 | 6/2010 | Schalick et al. | |
| 2010/0180263 A1 | 7/2010 | Lee et al. | |

OTHER PUBLICATIONS

Wenyu et al., "A Model of Remote Debugger Supporting Multiple Types of Connection", 2011.*
International Search Report and Written Opinion correlating to PCT/IB2010/055418 dated Aug. 1, 2011.
Sidwell, Nathan et al.; "Non-stop Multi-Threaded Debugging in GDB"; codesourcery.com; 11 Pgs.

* cited by examiner

*Primary Examiner* — Phillip H Nguyen

(57) ABSTRACT

A method of debugging software for an Integrated Development Environment connected to a target hardware system and to a simulator configured to simulate the target hardware system. The method comprises receiving, by a debugging tool of the Integrated Development Environment, simulator debugging data from the simulator, receiving, by the debugging tool, hardware debugging data from the target hardware system, comparing, by the debugging tool, the hardware debugging data with the simulator debugging data; and indicating, by the debugging tool, the result of comparing the hardware debugging data with the simulator debugging data.

20 Claims, 2 Drawing Sheets

METHOD OF DEBUGGING SOFTWARE AND CORRESPONDING COMPUTER PROGRAM PRODUCT

FIELD OF THE INVENTION

This invention relates to a method of debugging software for an Integrated Development Environment and a corresponding computer program product.

BACKGROUND OF THE INVENTION

For modern computer systems, in particular embedded hardware systems with relatively low computational resources, software is often not developed directly on the target system, but on a host system which may or may not be connected to the target system and usually is more powerful in terms of computational resources. For this purpose, on the host system usually is provided an Integrated Development Environment (IDE) on which software may be developed, e.g. programmed, edited, compiled, etc. for the target system. An Integrated Development Environment usually comprises a debugging tool as well as further development tools. Thus it is possible to connect a hardware system for which the software is developed to the Integrated Development Environment such that software developed on the host system can be written to and then executed on the target system. For bug-checking and further development, the target system may provide debugging information to the Integrated Development Environment based on which further development or debugging of the software may be carried out.

SUMMARY OF THE INVENTION

The present invention provides a method of debugging software for an Integrated Development Environment and a computer program product stored on a computer-readable medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
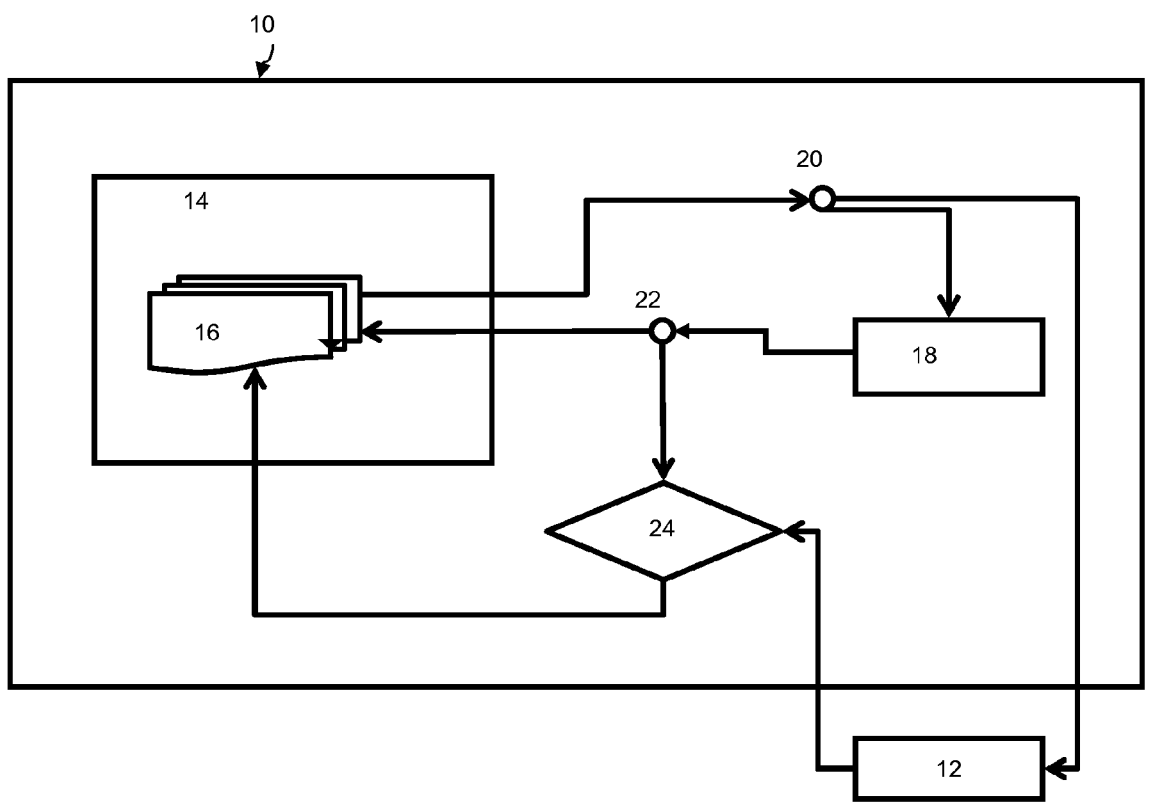
FIG. 1 schematically shows an example of an Integrated Development Environment connected to a target hardware system.

Because the illustrated embodiments of the present invention may for the most part be implemented using electronic components, software, programs and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the context of this description, an Integrated Development Environment (IDE) may be considered to comprise one ore more software applications providing one or more development tools for the development of software. The one or more development tools may be provided to one or more computer programmers. An Integrated Development Environment may also be called an Integrated Design Environment or an Integrated Debugging Environment. It may be considered that an Integrated Development Environment comprises a editor, which may be operable to edit source code and/or a compiler for compiling source code and/or an interpreter for interpreting source code and/or build automation tools. An Integrated Development Environment may comprise a debugging tool. It may be envisioned that an Integrated Development Environment comprises a graphic user interface and/or a class browser and/or an object inspector and/or a class hierarchy diagram or similar tools. An Integrated Development Environment may be adapted for a specific programming language and/or compiler or compiler set. It may be envisioned that an Integrated Development Environment may be used with any kind of compiler, interpreter and/or programming language. An Integrated Development Environment may run on a host computer system. A host computer system may be considered to be part of the Integrated Development Environment. It may be considered that a host computer system comprises one or more individual computers, workstations and/or blades in any suitable combination. A host computer system may comprise a cluster of computers. In the context of this description, it may be contemplated that a computer system providing one or more terminals in which suitable development tools may be used comprises an Integrated Development Environment. It may be considered that components of an Integrated Development Environment communicate or access common data directly in memory and/or communicate indirectly via a filesystem and/or communication pipes, for example pipes as provided on UNIX-like systems. An Integrated Development Environment may be considered to provide a one or more Graphical User Interfaces and/or command-line interfaces. It may be contemplated that a debugging tool comprising one or more interfaces to receive debugging information represents an Integrated Development Environment.

It may be considered that a target hardware system comprises hardware for which software is to be developed. A target hardware system may be any kind of computer system, e.g. an embedded hardware system. An embedded hardware system or computer system may comprise at least a microcontroller and/or a microcomputer and/or central processing unit. A central processing unit may have one or more processing cores. A hardware system may comprise one or more items of a group of memory units or storage units of any kind, e.g. RAM, magnetic-optical devices, hard disks, flash memory, etc. It may be envisioned that a target hardware system comprises one or more input/output devices via which it may be connected or connectable to the Integrated Development Environment and/or the host computer system on which the Integrated Development Environment is being executed. An input/output device may be any kind of connection capable of transmitting data between the Integrated Development Environment and the target hardware system. In particular, the connection provided by the input/output device may be a wireless connection and/or a connection via Ethernet and/or a connection via USB and/or a serial connection. It may be feasible that an input/output device of the target hardware system comprises a WiFi device and/or an Ethernet device and/or a USB port and/or a serial port. It may be contemplated that the target hardware system is configured to provide debugging information in respect to software executed on it. A target hardware system may be configured to provide functions according to the JTAG (Joint Test Action Group) standard, which may provide debugging information. The target hardware system may comprise a JTAG-compatible device. It may be envisioned that the target hardware system and the host computer system are connected via a connection providing debugging information, which may be debugging information according to the JTAG standard. A target hardware system may be considered to comprise firmware and/or software running on the hardware. It may comprise an operating system, e.g. a GNU/Linux based operation system, a SmartDSP system, etc. Software under development for a target hardware system may be developed taking into account the specific hardware and/or firmware and/or operating system and/or further software of the target system. A target hardware system may for example comprise a mobile phone, digital signal processor (DSP), smartphone, computer, laptop, workstation, netbook, touchpad or any other kind of programmable system. A target hardware system may be any kind of embedded system or hardware system comprising a processor and/or memory and/or input/output interfaces. An embedded system or target hardware system may comprise a digital signal processor and/or a PowerPC processor and/or ARM-processor or any other suitable processor for computer systems.

A debugging tool or debugger may be considered to be a computer program or software that is used to test and/or debug other programs. A debugging tool may be arranged to provide, in particular display, information related or specific to debugging of software under development to a programmer. The debugging tool may be adapted to run a program under its control. It may be considered that a debugging tool runs a program step by step and/or stops it at certain points. A debugging tool may be configured to define one or more breakpoints in a target program at which the program stops and/or pauses to provide debugging information at defined points of program execution. A debugging tool may be considered to track the value of one or more variables and/or registers used by a target program. It may be envisioned that a debugging tool directly or indirectly provides a programmer with debugging data or debugging information. A debugging tool may provide or display debugging data, in particular simulator debugging data and/or hardware debugging data. Debugging data may comprise information regarding the values of one or more registers and/or one or more variables of a program or software at certain points of execution. It may be envisioned that a debugging tool provides such information upon a crash of the program. Examples for software used for debugging are the GNU project debugging tool GDB or DBX. The debugging tool may be used to examine what has happened when a program has stopped, e.g. when a program has crashed. A debugging tool may be considered to receive debugging data. The debugging data may be provided by a specific software routine and/or circuit of a target hardware system. For example, debugging information may be provided by a JTAG-compatible target hardware system. A debugging tool may be considered to be part of an Integrated Development Environment. It may be envisioned that a debugging tool comprises or is arranged to communicate with one or more debugging units and/or routines of a target hardware system. For example, a debugging client may be running on a target hardware system to provide debugging information to a debugging tool of an Integrated Development Environment. A debugging tool may be considered to be configured to receive and provide or display debugging data or debugging information, respectively. It may be considered that a debugging tool comprises one or more components. In particular, it may be considered that a debugging tool comprises a comparison unit and/or one or more components for receiving debugging data and/or one or more components for transmitting development data. Such components may be provided separately and/or as a common unit in any suitable combination.

A simulator may be configured to simulate a hardware system. In particular, it may be configured to simulate the target hardware system. A simulator may be considered to run on a simulator computer system. The simulator computer system may be identical to the host computer system running an Integrated Development Environment. It may be considered that the simulator is run on a simulation host system connected to the Integrated Development Environment. A connection may be achieved, e.g., via Ethernet or any other connection capable of transmitting data between the host computer system and the simulator computer system. The simulator may run on the host computer system on which the Integrated Development System runs. It may be considered that a simulator is connected to an Integrated Development Environment via an interface, in particular a software interface. It may be feasible to consider the simulator to be a part of the Integrated Development System. The simulator may provide an emulation of the hardware system. It may be considered that the simulator imitates the behaviour of the hardware system. The simulator may be arranged to simulate firmware and/or software, e.g. an operating system, running on the simulated hardware system. In particular, it may be considered that the simulator simulates the target hardware system and the firmware and/or software running on it. The simulator may simulate the target hardware system as completely as possible. A simulator may provide a simulation of the hardware/firmware/software environment of software under development running on the target hardware system. It may be considered that a simulator provides data, for example debugging data, in a similar way and/or format as the hardware it simulates. Data, in particular simulator debugging data, may be transmitted directly or indirectly from a simulator to transmission target, for example a host computer system and/or an Integrated Development Environment and/or a corresponding debugging tool. Generally, it may be assumed a data transmission connection of a simulator to transmission target like a host computer system and/or an Integrated Development Environment and/or a corresponding debugging tool transmits data faster than a connection between a target hardware system and a corresponding transmission target. It may be assumed that data transmitted from a simulator is transmitted and received by such a transmission target before corresponding data from a target hardware system is transmitted and received by the same transmission target. This may be true even if the transmissions of data are started simultaneously or even if transmission of data from the target hardware system starts before the transmission of corresponding data from the simulator starts. Differences in transmission speeds may be caused by the simulator being connected to the transmission target by a connection with much higher transmission speeds than the target hardware system. For example, the simulator may be running on the host computer system and thus communicate with a transmission target, for example the Integrated Development Environment or a component of it, via a direct interface, which may be a software interface. The target hardware system may be connected to the host computer system by a comparatively slow physical connection, e.g. via USB or a serial connection.

Software under development may be any kind of software or firmware. It may be considered that software under development is provided to a target hardware system in pre-compiled form, e.g. as a binary executable on the target hardware system. Software under development may be provided in a form executable by interpreter software running on the target hardware system. Software under development may be considered to be provided in the form of development data.

Development data may be considered to be data produced during development of software. Development data may be provided by an Integrated Development Environment to a simulator and/or a hardware system. Development data may be considered to contain software application code executable on the target hardware system and/or the simulator. Development data may be transmitted by a debugging tool to a target hardware system. It may be considered that development data comprises software in a form executable on a target hardware system, e.g. as a binary or in interpretable form. Hardware debugging data may be considered to comprise debugging data provided by a target hardware system. Simulator debugging data may be debugging data provided by a simulator of a target hardware system. Separate development data sets providing or comprising equal or corresponding software code may be considered to be the same or to correspond to each other, different components related to data transmission using different data transport standards notwithstanding. In particular, development data comprising or providing software executable in a comparable or similar manner on a simulator and the hardware system simulated may be considered to be the same development data in the context of this description. It may be considered that the development data represents or comprises a computer program or part of a computer program executable on the target hardware system and/or simulator.

Debugging data may comprise information about the values of one or more variables and/or registers of a target hardware system or the simulator at a given point of program execution. It may be considered that debugging data pertains to specific development data. In particular, debugging data may be produced and/or provided as a response to development data, in particular executable software, provided to a target hardware system and/or a simulator. It may be contemplated that simulator debugging data is provided by a simulator. Hardware debugging data may be provided by a target hardware system. Simulator debugging data may be compared with hardware debugging data. It may be considered that for comparing debugging data, simulator debugging data and hardware debugging data pertaining to the same development data, in particular to the same executable software, are used. It may be useful to filter and/or transform into another format hardware debugging data and/or simulator debugging data before comparing them. Debugging data may be considered to be hardware debugging data and/or simulator debugging data. It may be considered that debugging data may be provided or displayed in unprocessed or processed form. To provide or display debugging data in a processed form, any number of processes may be performed on the debugging data, for example formatting it into a specific format, filtering it, for example to exclude undesired data, etc. Processed or unprocessed debugging data may be considered to be debugging information, in particular if it is provided or displayed, for exampled to a programmer.

Now referring to FIG. 1, there is shown schematically a host computer system 10. Host computer system 10 may be connected to a target hardware system 12. Target hardware system 12 may be an embedded hardware system, for example a smartphone. Via the connection between target hardware system 12 and host computer system 10 data may be exchanged between the systems. In particular, it may be contemplated that via this connection development data may be transmitted to the target hardware system 12 and that hardware debugging data may be transmitted from the target hardware system 12 to the host computer system 10. Target hardware system 12 and host computer system 10 may be connected via a JTAG compatible connection. On host computer system 10, an Integrated Development Environment 14 may be provided. Integrated Development System 14 may comprise software running on host computer system 10. Integrated Development Environment 14 may comprise a debugging tool. It may be contemplated that Integrated Development Environment 14 comprises development tools, e.g. a source code editor and/or compiler. Integrated Development Environment 14 may provide one or more views or windows 16 on a display for a programmer to view. Integrated Development Environment 14 may be arranged such that a debugging tool provides or displays debugging information. Debugging information may be displayed in one or more views 16. A computer programmer may use the tools, e.g., a compiler, an editor and a debugging tool to develop software for the target hardware system 12.

The Integrated Development Environment 10 may be connected or connectable to a simulator 18. Simulator 18 may be configured to simulate or emulate the target hardware system 12. A connection may be provided between simulator 18 and Integrated Development Environment 14 over which Integrated Development Environment 14 and/or a debugging tool of the Integrated Development Environment 14 may communicate with simulator 18. In particular, a debugging tool of the Integrated Development Environment 14 may be configured to receive data, in particular simulator debugging data, from simulator 18. Integrated Development Environment 10 may provide views 16. A view 16 may represent information displayed by a component of Integrated Development Environment 10, for example using a window or a terminal view. The debugging tool may be configured to receive hardware debugging data from the target hardware system 14.

For purposes of communication, there may be provided communication nodes 20 and 22. Communication node 20 and/or node 22 may be a hub or router of a network, for example of an Ethernet-based network. It is feasible that node 20 and/or node 22 are implemented at least partly in software. Node 20 and/or node 22 may be implemented as part of host computer system 10 and/or Integrated Development System 14. It may be considered that Integrated Development Environment 14 may send or transmit data, in particular development data, to simulator 18 and/or target hardware system 12 via a connection. The connection may comprise node 20. Via node 22, data provided by simulator 18 may be sent to Integrated Development Environment 14, in particular to its debugging tool. The debugging tool may be configured to display data, for example simulator debugging data, provided by simulator 18 and received via node 22 on a view 16. A debugging data comparison unit 24 may be provided. It may be considered that comparison unit 24 is implemented to represent a debugging tool or is implemented as part of a debugging tool. Comparison unit or debugging tool 24 may configured to receive data, in particular simulator debugging data, from simulator 18. It may be connected to simulator 18 directly or indirectly, for example via node 22. It may be envisioned that debugging tool or comparison unit 24 is configured to receive data, in particular hardware debugging data, from target hardware system 12. Data from target hardware system may be provided directly or indirectly via a suitable connection. It may be considered that debugging tool or comparison unit 24 is configured to compare hardware debugging data with simulator debugging data. Debugging tool or comparison unit 24 may be arranged to indicate the result of comparing the hardware debugging data with the simulation debugging data. It may be considered that debugging tool or comparison unit 24 is arranged to provide or display hardware debugging data on one or more views 16 of Integrated Development Environment 14.

Figure 2:
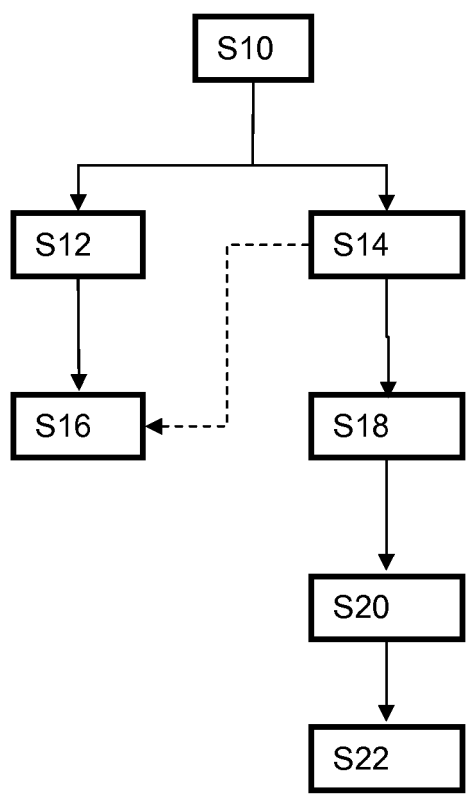
FIG. 2 schematically shows a method for debugging.

A method of debugging software for an Integrated Development Environment is now described with reference to FIG. 2. The method may be performed on or with a system as shown in FIG. 1. The Integrated Development Environment may be connected or connectable to a target hardware system. It may be contemplated that the Integrated Development Environment is connected to or comprises a simulator configured to simulate the target hardware system. Target hardware system may be target hardware system 12 as described above. It may be contemplated that the Integrated Development Environment is the Integrated Development Environment 14 described above and/or that the simulator is the above-described simulator 18. In the method, debugging information based on simulator debugging data and/or target debugging data may be provided or displayed, for example by a debugging tool or comparison unit of the Integrated Development Environment. Debugging information may be provided or displayed in view like a terminal view or a window. A view may for example be a view 16 as described above.

In an optional step S10, development data may be transmitted to the simulator and/or the target hardware system. The development data may be provided simultaneously to the simulator and/or the target hardware system. It may be contemplated that the development data may be provided or transmitted by the Integrated Development Environment, in particular by its debugging tool or comparison unit, which may be considered to be debugging tool or comparison unit 24 as described above.

In a step S12, simulator debugging data may be received from the simulator. The simulator debugging data may be received by a debugging tool of an Integrated Development Environment. It may be considered that step S12 follows in response to step S10. In particular, a simulator may provide the simulator debugging data in response to development data, which it may receive due to step S10 being performed.

In a step S14, hardware debugging data from the target hardware system may be received. The hardware debugging data may be received by the debugging tool. It may be considered that step S14 follows in response to step S10. In particular, a target hardware system may provide the hardware debugging data in response to development data, which it may receive due to step S10 being performed to transmit such development data to the target hardware system. It may be contemplated that the simulator debugging data received in step S12 and the hardware debugging data received in step S14 are based on the same development data and/or are received in response to the same development data.

Steps S12 and S14 may be performed in parallel or in any suitable order. However, it should be noted that the data transmission connection between the simulator and the Integrated Development Environment may be much faster than the connection providing hardware debugging data from the target hardware system. Thus, receiving the simulator debugging data by the debugging tool may be finished before the hardware debugging data is completely received by the debugging tool. It may be considered that step S12 or S14, respectively, has been finished when the corresponding debugging data has been transmitted and received completely. The corresponding debugging data may be the debugging data produced or provided in response to specific development data, which may be provided in step S10.

Following or during step S12, in a step S16 the simulator debugging data may be provided to a computer programmer in an unprocessed or processed form as simulator debugging information. It may be considered that debugging data received in step S12 is piped through to be displayed in step S16 and/or stored while it is received. The simulator debugging data may be displayed on a view, which may be a view 16 as described above. It may be considered that the simulator debugging data is provided on a display of the Integrated Development Environment or a display connected to an Integrated Development Environment or its host computer system. The display may be a screen of a computer monitor. It may be considered that debugging may be performed on the simulator debugging data or data based on the simulator debugging data while the Integrated Development Environment and/or its debugging tool or comparison unit still receives hardware debugging data from the target hardware system.

In a step S18, hardware debugging data may be compared with simulator debugging data. Step S18 may be performed piecewise on corresponding parts of debugging data already received in steps S12 and steps S14, while step S12 and/or step S14 are still performed. It may be considered that step S18 is performed when one or both of steps S12 and S14 have been finished. Comparing debugging data may be performed on complete sets of simulator and hardware debugging data, if they have been received completely. Step S18 may be performed by the debugging tool or comparison unit. It may be considered that in one or more of steps S12, S14 or S18, reformatting of debugging data is performed. It may be considered that comparing debugging data comprises the step of transforming and/or filtering the simulator debugging data and/or the hardware debugging data piecewise and/or in total. Such a step may be performed if the simulator provides simulator debugging data in a different format than the hardware system. In step S18 it may be determined that the simulator debugging data corresponds to the hardware debugging data. In particular, it may be determined that the simulator debugging data is equal to the hardware debugging data. In this case, it may be considered that the simulator provides a reliable simulation of the target hardware system. It may be determined in step S18 that the hardware debugging data does not correspond to the simulator debugging data. It may be considered to interrupt step S18 in the case the debugging data do not correspond. Step S18 may be carried out on the complete sets of debugging data even if it has been determined that they do not correspond. In this way is possible to provide additional information about the correspondence or lack thereof between the debugging data sets.

It may be considered that a step S20 is performed after or, at least partially, parallel to step S18. Step S20 may be performed by a suitable component of the Integrated Development Environment, in particular by a debugging tool or comparison unit. In step S20, the result of step S18, namely of comparing the hardware debugging data with the simulator debugging data, may be indicated. If in step S18 it was determined that the hardware debugging data corresponds to the simulator debugging data, a corresponding signal may be provided. It may be considered that a signal indicating that step S18 has been performed may be provided. In particular, it may be considered that providing a signal only indicating that step S18 has been performed or completed indicates that the hardware debugging data corresponds to the simulator debugging data. In this case, the method may branch to step S16, in which simulator debugging information is displayed for debugging. After debugging, it may be branched to step S10 to begin the debugging process anew.

If in step S18 it was determined that the simulator debugging data and the hardware debugging data do not correspond to each other and/ or are to be considered not equal, a corresponding indication may be provided in step S20. It may be considered that in this case fault indication information is provided, for example by the debugging tool or comparison unit. Fault indication information may be provided in the form of a signal indicative of the result that the simulator debugging data and the hardware debugging data are not equal or do not correspond. It may be considered that the corresponding indication is provided on a display or view, which may be a view 16. Fault indication information may comprise information regarding where the debugging data did not correspond. It may be considered that fault indication information indicates that the simulator does not correctly simulate the target hardware system. It may provide an indication that the target hardware system is faulty. If it was indicated in step S20 that the hardware debugging data does not correspond to the simulator debugging data, it may be branched to step S22.

In step S22, the hardware debugging data may be displayed as hardware debugging information. Step S22 may be performed by a suitable component of the Integrated Development Environment, in particular by a debugging tool or comparison unit. The hardware debugging information may be displayed on a view, which may be a view 16 as described above. In particular, it may be contemplated that the hardware debugging information is displayed on the same view as the simulator debugging information was displayed in step S16. The simulator debugging information may be replaced by the hardware debugging information. It may be indicated on the same view or a separate view that the hardware debugging data did not correspond to the simulator debugging data and/ or that the simulator debugging information is replaced.

In the case that step S14 of receiving the hardware debugging information is performed faster than step S12, it may be considered that in step S16 hardware debugging information is displayed instead of the software debugging information (see dashed line). Generally, it may be considered that simulator debugging data and/or hardware debugging data is provided in parts. Parts may be ordered in a pre-defined order. In the case that the target hardware system provides a given part faster than the simulator provides the corresponding part of the debugging data, it may be considered that the hardware debugging data is displayed or provided instead of the simulator debugging data. Thus, a mixture of parts of debugging data received in steps S12 and S14 respectively from the target hardware system and the simulator may be provided or displayed. Whether a given part of debugging data is displayed or provided may depend on time of arrival of the respective part of debugging data. Choosing which debugging data is to be provided or displayed in step S16 may be performed independently of comparing the debugging data in step S18. In particular, comparing the debugging data may be performed regardless of which parts of debugging data are received and displayed or in which order they are displayed. It may be considered that, if a part of the hardware debugging data is received before a corresponding part of the simulator debugging data, the part of hardware debugging data is displayed or provided. If the part of the simulator debugging data is received before the corresponding part of the hardware debugging data, the part of the simulator debugging data may be displayed.

The present invention also pertains to a computer program product stored on a computer-readable medium comprising instructions for a computer system to perform one of the described methods. The computer system may be a host system on which an Integrated Development Environment runs.

The method described above allows to receive and display debugging information via an interface to a simulator, which is usually much faster than a hardware interface to a target hardware system. Thus, debugging may be performed without having to wait due to a slow interface. According to the method, by comparing the hardware debugging data received at a comparatively late point in time with the simulator debugging data, it is possible to ensure that the debugging process is performed on correct debugging data.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/ output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. Connections may be wireless connections, for example via WiFi, Bluetooth, UMTS, etc. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the host system may be implemented as a group of interconnected computers, e.g. as a cluster, a server farm, a blade system, etc.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of debugging software for a Integrated Development Environment connected to a target hardware system and to a simulator, the method comprising:
    receiving, by a debugging tool of the Integrated Development Environment, simulator debugging data from the simulator, the simulator configured to simulate the target hardware system;
    receiving, by the debugging tool, hardware debugging data from the target hardware system;
    comparing, by the debugging tool, the hardware debugging data with the simulator debugging data; and
    indicating, by the debugging tool, the result of comparing the hardware debugging data with the simulator debugging data.

2. The method according to claim 1, wherein the method comprises
    transmitting development data to the simulator and to the target hardware system.

3. The method according to claim 2, wherein the development data is simultaneously provided to the simulator and the target hardware system.

4. The method according to claim 1, comprising
    providing debugging information based on the simulator debugging data.

5. The method according to claim 1, comprising:
    providing fault indication information if the simulator debugging data and the hardware debugging information is different.

6. The method according to claim 1, wherein the simulator debugging data is received faster than the hardware debugging data.

7. The method according to claim 1, wherein the simulator debugging data and the hardware debugging data are based on the same development data.

8. The method according to claim 2, wherein the development data contains software application code executable on the target hardware system.

9. A system comprising:
a target hardware system;
an Integrated Development Environment coupled to a simulator, the simulator configured to simulate the target hardware system;
a debugging tool configured to:
receive simulator debugging data from the simulator, the simulator configured to simulate the target hardware system:
receive hardware debugging data from the target hardware system;
compare the hardware debugging data with the simulator debugging data; and
indicate the result of comparing the hardware debugging data with the simulator debugging data.

10. The system according to claim 9, wherein development data is transmitted to the simulator and to the target hardware system.

11. The system according to claim 10, wherein the development data is simultaneously provided to the simulator and the target hardware system.

12. The system according to claim 9, wherein the debugging tool is further configured to provide debugging information based on the simulator debugging data.

13. The system according to claim 9, wherein the debugging tool is further configured to provide fault indication information if the simulator debugging data and the hardware debugging information is different.

14. The system according to claim 9, wherein the simulator debugging data is received faster than the hardware debugging data.

15. The system according to claim 9, wherein the simulator debugging data and the hardware debugging data are based on the same development data.

16. The system according to claim 10, wherein the development data includes software application code executable on the target hardware system.

17. A system comprising:
a memory; and
computer readable instructions stored at the memory and executable by a microprocessor to:
receive, by a debugging tool of an Integrated Development Environment, simulator debugging data from a simulator, the simulator configured to simulate a target hardware system;
receive, by the debugging tool, hardware debugging data from the target hardware system;
compare, by the debugging tool, the hardware debugging data with the simulator debugging data; and
indicate, by the debugging tool, the result of comparing the hardware debugging data with the simulator debugging data.

18. The system of claim 17, further comprising instructions to:
transmit development data to the simulator and to the target hardware system.

19. The system of claim 17, further comprising instructions to:
provide fault indication information if the simulator debugging data and the hardware debugging information is different.

20. The system of claim 17, further comprising instructions to:
provide debugging information based on the simulator debugging data.

* * * * *